(12) United States Patent
Zhao et al.

(10) Patent No.: US 10,706,314 B2
(45) Date of Patent: Jul. 7, 2020

(54) IMAGE RECOGNITION METHOD, APPARATUS AND DEVICE, AND NON-VOLATILE COMPUTER STORAGE MEDIUM

(71) Applicant: BAIDU ONLINE NETWORK TECHNOLOGY (BEIJING) CO., LTD., Haidian District Beijing (CN)

(72) Inventors: Chen Zhao, Haidian District Beijing (CN); Haoyuan Gao, Haidian District Beijing (CN); Ji Liang, Haidian District Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 80 days.

(21) Appl. No.: 16/081,329

(22) PCT Filed: May 23, 2016

(86) PCT No.: PCT/CN2016/082970
§ 371 (c)(1),
(2) Date: Aug. 30, 2018

(87) PCT Pub. No.: WO2017/161665
PCT Pub. Date: Sep. 28, 2017

(65) Prior Publication Data
US 2019/0019053 A1    Jan. 17, 2019

(30) Foreign Application Priority Data
Mar. 23, 2016    (CN) .......................... 2016 1 0170233

(51) Int. Cl.
*G06K 9/34*    (2006.01)
*G06K 9/00*    (2006.01)
(Continued)

(52) U.S. Cl.
CPC .......... *G06K 9/34* (2013.01); *G06K 9/00771* (2013.01); *G06K 9/6201* (2013.01); *G06T 7/11* (2017.01);
(Continued)

(58) Field of Classification Search
CPC combination set(s) only.
See application file for complete search history.

(56) References Cited

U.S. PATENT DOCUMENTS 5,546,475 A * 8/1996 Bolle .................. G06K 9/4647
382/190
5,638,465 A * 6/1997 Sano .................... G06K 9/6228
382/159
(Continued)

FOREIGN PATENT DOCUMENTS

CN    101149792 A    3/2008
CN    101853387 A    10/2010
(Continued)

OTHER PUBLICATIONS

Chinese Office Action dated Jan. 18, 2017, for related Chinese Appln. No. 201610170233.5; 4 Pages.
(Continued)

*Primary Examiner* — Tsung Yin Tsai
(74) *Attorney, Agent, or Firm* — Brooks Kushman PC

(57) ABSTRACT

The present disclosure provides an image recognition method and apparatus, a device and a non-volatile computer storage medium. In embodiments of the present disclosure, it is feasible to obtain the to-be-recognized image of the designated space, then perform image segmentation processing for the to-be-recognized image, to obtain at least one area image of the designated space, and then perform image matching processing for each area image in said at least one area image, to obtain a reference image corresponding to
(Continued)

said each area image, so that it is possible to perform recognition processing for said each area image according to image information of the reference image corresponding to said each area image to obtain article information of said each area image. The so doing does not require manual participation and exhibits simple operations and a high rate of correctness, and thereby improves the recognition efficiency and reliability.

17 Claims, 2 Drawing Sheets

(51) Int. Cl.
*H04N 5/232* (2006.01)
*G06T 7/11* (2017.01)
*G06T 7/174* (2017.01)
*G06K 9/62* (2006.01)

(52) U.S. Cl.
CPC ......... *G06T 7/174* (2017.01); *H04N 5/23229* (2013.01); *G06K 2209/17* (2013.01)

(56) References Cited

U.S. PATENT DOCUMENTS

| | | | |
|---|---|---|---|
| 7,903,838 B2 | 8/2011 | Hudnut et al. | |
| 8,170,280 B2 * | 5/2012 | Zhao | G06K 9/00295 382/103 |
| 8,229,161 B2 | 7/2012 | Hudnut et al. | |
| 9,098,825 B2 * | 8/2015 | Bashkin | G06Q 10/087 |
| 9,240,077 B1 * | 1/2016 | Kraft | G06T 19/006 |
| 9,720,934 B1 * | 8/2017 | Dube | G06F 16/583 |
| 2002/0138374 A1 * | 9/2002 | Jennings | G06K 9/6204 705/29 |
| 2005/0196046 A1 | 8/2005 | Hudnut et al. | |
| 2010/0077003 A1 * | 3/2010 | Kondo | G06F 16/5838 707/780 |
| 2011/0268311 A1 | 3/2011 | Hudnut et al. | |
| 2014/0233799 A1 * | 8/2014 | Cho | G06K 9/6201 382/103 |
| 2015/0363670 A1 * | 12/2015 | Sugishita | G06K 9/00771 382/155 |
| 2016/0240025 A1 * | 8/2016 | Bashkin | A47F 3/06 |

FOREIGN PATENT DOCUMENTS

| | | |
|---|---|---|
| CN | 102063616 A | 5/2011 |
| CN | 102982332 A | 3/2013 |
| CN | 103150631 A | 6/2013 |
| CN | 103617420 A | 3/2014 |
| CN | 103793192 A | 5/2014 |
| CN | 104061748 A | 9/2014 |
| CN | 204002281 U | 12/2014 |
| CN | 104990325 A | 10/2015 |
| CN | 204795393 U | 11/2015 |
| CN | 105118123 A | 12/2015 |
| CN | 105180590 A | 12/2015 |
| WO | 2014146431 A1 | 9/2014 |

OTHER PUBLICATIONS

Second Chinese Office Action dated Nov. 8, 2017, for related Chinese Appln. No. 201610170233.5; 5 Pages.
First Chinese Search Report for related Chinese Appln. No. 201610170233.5; 1 Page.
Second Chinese Search Report for related Chinese Appln. No. 201610170233.5; 1 Page.
Rejection Decision dated May 3, 2017, for related Chinese Appln. No. 201610170233.5; 5 Pages.
Rejection Decision dated Mar. 28, 2018, for related Chinese Appln. No. 201610170233.5; 4 Pages.
Re-Examination Decision dated Sep. 29, 2017, for related Chinese Appln. No. 201610170233.5; 1 Page.
PCT Search Report dated Nov. 28, 2016 for related PCT Application No. PCT/CN2016/082970; 13 Pages.

* cited by examiner

US 10,706,314 B2

IMAGE RECOGNITION METHOD, APPARATUS AND DEVICE, AND NON-VOLATILE COMPUTER STORAGE MEDIUM

CROSS-REFERENCE TO RELATED APPLICATIONS

This application is the U.S. national phase of PCT Application No. PCT/CN2016/082970 filed on May 23, 2016, which claims priority to Chinese Patent Application No. 201610170233.5 filed on Mar. 23, 2016, the disclosures of which are incorporated in their entirety by reference herein.

FIELD OF THE DISCLOSURE

The present disclosure relates to image processing technologies, and particularly to an image recognition method and apparatus, a device and a non-volatile computer storage medium.

BACKGROUND OF THE DISCLOSURE

Usually, articles such as art works, beverages and snacks may be placed in storage equipment such as refrigerators, freezers, display cabinets or open-type goods shelves so that consumers may store, observe or select and purchase the articles.

In the prior art, a staff member makes statistics on the spot of the storage equipment to recognize basic situations of the internal space of the storage equipment, for example, placement positions of articles, the number of articles and so on. This causes complicated operations, long operation duration and likelihood of errors, and therefore causes reduction of the recognition efficiency and reliability.

SUMMARY OF THE DISCLOSURE

A plurality of aspects of the present disclosure provide an image recognition method and apparatus, a device and a non-volatile computer storage medium, to improve recognition efficiency and reliability.

According to another aspect of the present disclosure, there is provided an image recognition method, comprising:
  obtaining a to-be-recognized image of a designated space;
  performing image segmentation processing for the to-be-recognized image, to obtain at least one area image of the designated space;
  performing image matching processing for each area image in said at least one area image, to obtain a reference image corresponding to said each area image;
  performing recognition processing for said each area image according to image information of the reference image corresponding to said each area image, to obtain article information of said each area image.

The above aspect and any possible implementation mode further provide an implementation mode: the designated space comprises an internal space of storage equipment.

The above aspect and any possible implementation mode further provide an implementation mode: the performing image segmentation processing for the to-be-recognized image, to obtain at least one area image of the designated space comprises:
  using an article detector to perform image segmentation processing for the to-be-recognized image, to obtain at least one area image of the designated space.

The above aspect and any possible implementation mode further provide an implementation mode: the performing image matching processing for each area image in said at least one area image, to obtain a reference image corresponding to said each area image comprises:
  using each area image in said at least one area image to perform image matching processing in a pre-collected reference image of the designated article, to obtain the reference image corresponding to said each area image.

The above aspect and any possible implementation mode further provide an implementation mode: the performing recognition processing for said each area image according to image information of the reference image corresponding to said each area image, to obtain article information of said each area image comprises:
  performing recognition processing for said each area image according to image information of the reference image corresponding to said each area image and a recognition weight of the reference image, to obtain article information of said each area image.

The above aspect and any possible implementation mode further provide an implementation mode: before obtaining a to-be-recognized image of a designated space, the method further comprises:
  obtaining a movement state of a door body of the storage equipment where the designated space lies; and
  controlling ON and OFF of a camera device according to the movement state, to use the camera device to shoot the to-be-recognized image of the designated space.

The above aspect and any possible implementation mode further provide an implementation mode: the obtaining a movement state of a door body of the storage equipment where the designated space lies comprises:
  using a sensor device to obtain movement parameters of the door body; and
  obtaining the movement state of the door body according to the movement parameters.

According to another aspect of the present disclosure, there is provided an image recognition apparatus, comprising:
  an obtaining unit configured to obtain a to-be-recognized image of a designated space;
  a segmenting unit configured to perform image segmentation processing for the to-be-recognized image, to obtain at least one area image of the designated space;
  a matching unit configured to perform image matching processing for each area image in said at least one area image, to obtain a reference image corresponding to said each area image;
  a recognition unit configured to perform recognition processing for said each area image according to image information of the reference image corresponding to said each area image, to obtain article information of said each area image.

The above aspect and any possible implementation mode further provide an implementation mode: the designated space comprises an internal space of storage equipment.

The above aspect and any possible implementation mode further provide an implementation mode: the segmenting unit is specifically configured to
  use an article detector to perform image segmentation processing for the to-be-recognized image, to obtain at least one area image of the designated space.

The above aspect and any possible implementation mode further provide an implementation mode: the matching unit is specifically configured to use each area image in said at least one area image to perform image matching processing in a pre-collected reference image of the designated article, to obtain the reference image corresponding to said each area image.

The above aspect and any possible implementation mode further provide an implementation mode: the recognition unit is specifically configured to perform recognition processing for said each area image according to image information of the reference image corresponding to said each area image and a recognition weight of the reference image, to obtain article information of said each area image.

The above aspect and any possible implementation mode further provide an implementation mode: the image recognition apparatus further comprises a control unit configured to obtain a movement state of a door body of the storage equipment where the designated space lies; and control ON and OFF of a camera device according to the movement state, to use the camera device to shoot the to-be-recognized image of the designated space.

The above aspect and any possible implementation mode further provide an implementation mode: the control unit is specifically configured to use a sensor device to obtain movement parameters of the door body; and obtain the movement state of the door body according to the movement parameters.

According to a further aspect of the present disclosure, there is provided a device, comprising one or more processor;

a memory;

one or more programs stored in the memory and configured to execute the following operations when executed by the one or more processors:

obtaining a to-be-recognized image of a designated space;

performing image segmentation processing for the to-be-recognized image, to obtain at least one area image of the designated space;

performing image matching processing for each area image in said at least one area image, to obtain a reference image corresponding to said each area image;

performing recognition processing for said each area image according to image information of the reference image corresponding to said each area image, to obtain article information of said each area image.

According to a further aspect of the present disclosure, there is provided a non-volatile computer storage medium in which one or more programs are stored, an apparatus being enabled to execute the following operations when said one or more programs are executed by the apparatus:

obtaining a to-be-recognized image of a designated space;

performing image segmentation processing for the to-be-recognized image, to obtain at least one area image of the designated space;

performing image matching processing for each area image in said at least one area image, to obtain a reference image corresponding to said each area image;

performing recognition processing for said each area image according to image information of the reference image corresponding to said each area image, to obtain article information of said each area image.

As known from the above technical solutions, in embodiments of the present disclosure, it is feasible to obtain the to-be-recognized image of the designated space, then perform image segmentation processing for the to-be-recognized image, to obtain at least one area image of the designated space, and then perform image matching processing for each area image in said at least one area image, to obtain a reference image corresponding to said each area image, so that it is possible to perform recognition processing for said each area image according to image information of the reference image corresponding to said each area image to obtain article information of said each area image. The so doing does not require manual participation and exhibits simple operations and a high rate of correctness, and thereby improves the recognition efficiency and reliability.

In addition, according to the technical solution according to the present disclosure, once the to-be-recognized image of the designated space is obtained, it is possible to automatically recognize the article information of the to-be-recognized image, effectively improve the recognition efficiency and effectively improve an recognition automation degree.

In addition, according to the technical solution according to the present disclosure, the change of the designated space is mainly caused by a manual operation, for example, an operator opens a door body of the storage equipment where the designated space lies, and takes an article away. Therefore, it is possible to control ON and OFF of a camera device according to a movement state of the door body of the storage equipment where the designated space lies, to use the camera device to shoot the to-be-recognized image of the designated space, thereby effectively reducing power consumption of the camera device.

BRIEF DESCRIPTION OF DRAWINGS

To describe technical solutions of embodiments of the present disclosure more clearly, figures to be used in the embodiments or in depictions regarding the prior art will be described briefly. Obviously, the figures described below are only some embodiments of the present disclosure. Those having ordinary skill in the art appreciate that other figures may be obtained from these figures without making inventive efforts.

DETAILED DESCRIPTION OF PREFERRED EMBODIMENTS

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

It needs to be appreciated that the terminals involved in the embodiments of the present disclosure comprise but are not limited to a mobile phone, a Personal Digital Assistant (PDA), a wireless handheld device, a tablet computer, a Personal Computer (PC), an MP3 player, an MP4 player, and a wearable device (e.g., a pair of smart glasses, a smart watch, or a smart bracelet).

In addition, the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Figure 1:
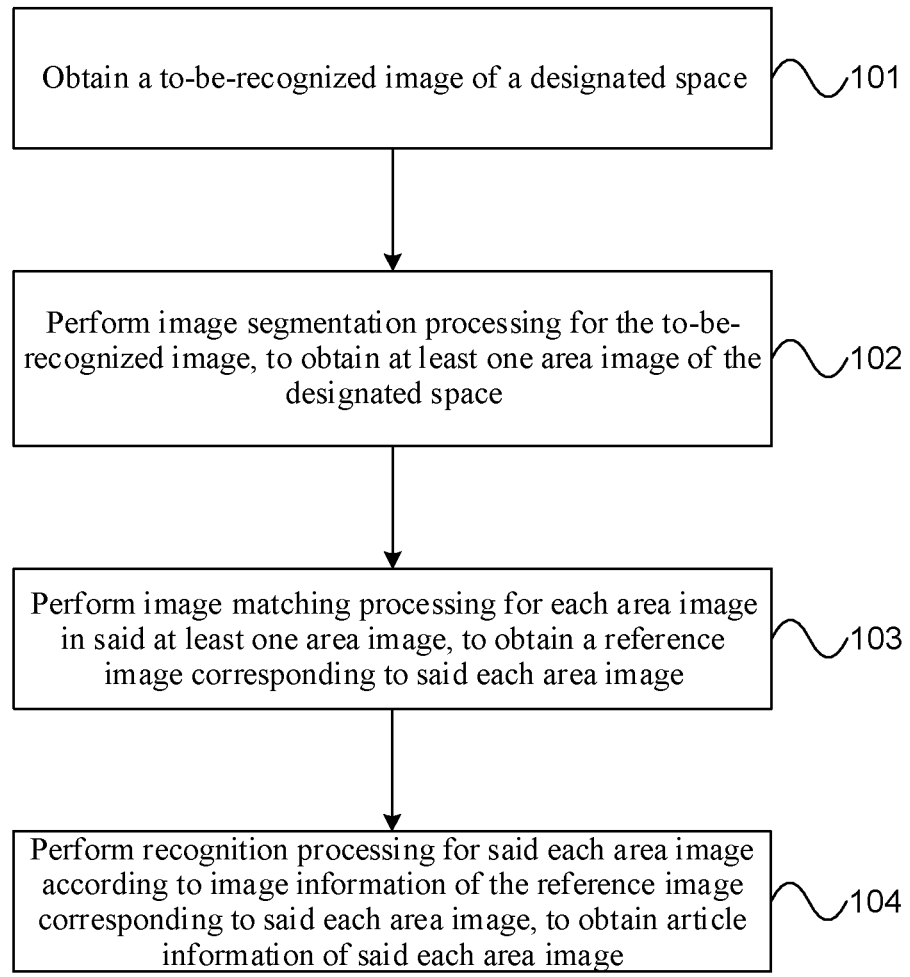
FIG. 1 is a flow chart of an image recognition method according to an embodiment of the present disclosure.

FIG. 1 is a flow chart of an image recognition method according to an embodiment of the present disclosure. As shown in FIG. 1, the method comprises the following steps:

101: obtaining a to-be-recognized image of a designated space.

The so-called designated space may refer to an internal space of storage equipment, for example, an internal space of storage equipment such as a display cabinet, an open-type goods shelf, a refrigerator and a freezer.

102: performing image segmentation processing for the to-be-recognized image, to obtain at least one area image of the designated space.

103: performing image matching processing for each area image in said at least one area image, to obtain a reference image corresponding to said each area image.

104: performing recognition processing for said each area image according to image information of the reference image corresponding to said each area image, to obtain article information of said each area image.

It needs to be appreciated that a subject for executing 101-104 may be an application located at a local terminal, or a function unit such as a plug-in or Software Development Kit (SDK) arranged in the application located at the local terminal, or a processing engine located in a network-side server, or a distributed type system located on the network side. This is not particularly limited in the present embodiment.

It may be understood that the application may be a native application (nativeAPP) installed on the terminal, or a webpage program (webApp) of a browser on the terminal. This is not particularly limited in the present embodiment.

As such, it is feasible to obtain the to-be-recognized image of the designated space, then perform image segmentation processing for the to-be-recognized image, to obtain at least one area image of the designated space, and then perform image matching processing for each area image in said at least one area image, to obtain a reference image corresponding to said each area image, so that it is possible to perform recognition processing for said each area image according to image information of the reference image corresponding to said each area image to obtain article information of said each area image. The so doing does not require manual participation and exhibits simple operations and a high rate of correctness, and thereby improves the recognition efficiency and reliability.

The so-called image refers to a file formed by employing a certain image format and storing image data, namely image pixels, in a certain manner, and may also be called an image file.

The image format of the image, namely, a format in which the image is stored, may include but not limited to: Bitmap (BMP) format, Portable Network Graphic Format (PNG), Joint Photographic Experts Group (JPEG) format, and Exchangeable Image File Format (EXIF). This is not particularly defined in the present embodiment.

The change of the designated space is mainly caused by a manual operation, for example, an operator opens a door body of the storage equipment where the designated space lies, and takes an article away. Therefore, it is possible to control ON and OFF of a camera device according to a movement state of the door body of the storage equipment where the designated space lies, to use the camera device to shoot the to-be-recognized image of the designated space, thereby effectively reducing power consumption of the camera device. In addition, this can effectively reduce a processing burden of the system processing the shot to-be-recognized image.

Optionally, in a possible implementation mode of the present embodiment, before 101, it is possible to further obtain the movement state of the door body of the storage equipment where the designated space lies, and then control ON and OFF of the camera device according to the movement state, to use the camera device to shoot the to-be-recognized image of the designated space.

Specifically, the camera device may use an image sensor to collect the to-be-recognized image of the designated space. The image sensor may be a Charge Coupled Device (CCD) sensor, or a Complementary Metal-Oxide Semiconductor (CMOS) sensor. This is not particularly limited in the present embodiment. In addition, the camera device may be installed on the door body of the storage equipment or in the interior of the storage equipment according to a position where the camera device shoots image content. At this time, it is necessary to ensure that the article in the interior of the storage equipment cannot shield the camera device. This is not particularly limited in the present embodiment.

In a specific implementation procedure, it is specifically feasible to use the sensor device installed on the door body to obtain movement parameters of the door body, for example, at least one of acceleration, rotation angular speed and rotation angle, and then obtain the movement state of the door body according to the movement parameters.

For example, it is feasible to use an acceleration sensor to obtain the acceleration of the door body, or use a gyro to obtain the rotation angular speed of the door body, or use the acceleration sensor and the gyro to obtain the rotation angular speed and the rotation angle of the door body. This is not particularly limited in the present embodiment.

Assuming that the door body-opening direction is a positive direction, and if the rotation angular speed is positive and larger than or equal to a preset opening threshold, it may be judged that the door body opens; after the door body is opened, the acceleration is smaller than or equal to a preset stationary threshold, it may be judged that the door body is stationary; if the rotation angular speed is negative and the rotation angle is smaller than or equal to a preset closing threshold, it may be judged that the door closes.

Then, when the door body is stationary, a start instruction may be sent to the camera device; when the door body is closed, a stop instruction may be sent to the camera device. After the start instruction is received, the camera device begins to shoot the to-be-recognized image of the designated space until the stop instruction is received.

For example, after the start instruction is received, the camera device may begin to perform continuous shooting processing for the designated space at a preset shooting frequency, to obtain several shot images by shooting the designated space this time, and perform storage processing for these shot images. After the stop instruction is received, a shot image is selected from the stored shot images for policy processing, to determine whether the shot image needs to serve as the to-be-recognized image for performing

101-104. If the capture image needs to serve as the to-be-recognized image, it is possible to use a wireless communication module such as a Wireless Fidelity (Wi-Fi) module, a Global System for Mobile Communications (GSM) module or a General Packet Radio Service (GPRS) to upload the to-be-recognized image to a server. After obtaining the to-be-recognized image, the server may perform image recognition processing for the to-be-recognized image, and update a processing result to a recognition platform.

Specifically speaking, the employed policy processing method is not content concerned by the present disclosure, and will not be detailed herein any more. Furthermore, to save the storage space, it is further possible to perform deletion processing for unselected other shot images.

Optionally, in a possible implementation mode of the present embodiment, in 102, it is specifically feasible to use an article detector to perform image segmentation processing for the to-be-recognized image, to obtain at least one area image of the designated space.

In a specific implementation procedure, it is possible to pre-train by using a training sample set to build the employed article detector.

As appreciated, the training samples included in the training sample set may be annotated known samples so that these known samples may be used directly to train to build the article detector; or it is possible that the training samples are partially annotated known samples and partially unannotated unknown samples so that it is possible to first use the known samples to train to build an initial article detector, and then use the initial article detector to predict the unknown samples to obtain a detection result, then annotate the unknown samples according to the detection result of the unknown samples to form known samples as newly-added known samples, use the newly-added known samples and originally known samples to re-train to build a new article detector until the built article detector or known samples satisfies a cut-off condition of the article detector, for example, the detection accuracy is larger than or equal to a preset accuracy threshold or the number of known samples is larger than or equal to a preset number threshold. This is not particularly limited in the present embodiment.

In this implementation mode, the article detector may obtain at least one area image of the designated space by many methods. This is not particularly limited in the present embodiment.

A method may be a detection method based on a candidate image set: extracting candidate images of several areas of the to-be-recognized image, and detecting each candidate image to obtain whether each candidate image is an article image of the article to be detected. If the candidate image is the article image of the article to be detected, the candidate image is regarded as one of said area images.

Another method may be a detection method for direct detection and positioning: detecting a location of the article in the to-be-recognized image by directly positioning the location of the article and an area where the article lies, thereby obtaining the area image corresponding to the article.

Optionally, in a possible implementation mode of the present embodiment, in 103, it is specifically feasible to use each area image in said at least one area image to perform image matching processing in a pre-collected reference image of the designated article, to obtain the reference image corresponding to said each area image.

Specifically, the image matching processing may be performed by employing many matching methods in the prior art. For details, please refer to relevant content in the prior art, and no details are presented here any more. If a reference image larger than or equal to a preset matching threshold is matched, it may be determined that the object in the area image is the object that really needs recognizing. If a reference image smaller than the matching threshold is matched or no reference image is matched, it may be determined that the object in the area image is not the object that really needs recognizing.

Optionally, in a possible implementation mode of the present embodiment, in 104, it is specifically feasible to perform recognition processing for said each area image according to image information of the reference image corresponding to said each area image and a recognition weight of the reference image, to obtain article information of said each area image.

In a specific implementation procedure, it is specifically feasible to pre-annotate each reference image, to obtain image information of each reference image, for example, basic attributes such as name and origin of the article. In addition to annotating the reference image, it is also necessary to set a recognition weight of each reference image, so that recognition processing for the matched area image is performed according to image information of these reference images.

Assuming that a certain area image is matched with three reference images, the recognition weights of the three reference images are equal. If the image information of one reference image is the Arctic Ocean, the image information of another reference image is also the Arctic Ocean and the image information of the last reference image is Coca Cola, it is possible to obtain that the article information of the area image is the Arctic Ocean according to the image information of the three reference images and the recognition weight of each reference image.

In the present embodiment, it is feasible to obtain the to-be-recognized image of the designated space, then perform image segmentation processing for the to-be-recognized image, to obtain at least one area image of the designated space, and then perform image matching processing for each area image in said at least one area image, to obtain a reference image corresponding to said each area image, so that it is possible to perform recognition processing for said each area image according to image information of the reference image corresponding to said each area image to obtain article information of said each area image. The so doing does not require manual participation and exhibits simple operations and a high rate of correctness, and thereby improves the recognition efficiency and reliability.

In addition, according to the technical solution according to the present disclosure, once the to-be-recognized image of the designated space is obtained, it is possible to automatically recognize the article information of the to-be-recognized image, effectively improve the recognition efficiency and effectively improve an recognition automation degree.

In addition, according to the technical solution according to the present disclosure, the change of the designated space is mainly caused by a manual operation, for example, an operator opens a door body of the storage equipment where the designated space lies, and takes an article away. Therefore, it is possible to control ON and OFF of a camera device according to a movement state of the door body of the storage equipment where the designated space lies, to use the camera device to shoot the to-be-recognized image of the designated space, thereby effectively reducing power consumption of the camera device.

It needs to be appreciated that regarding the aforesaid method embodiments, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

Figure 2:
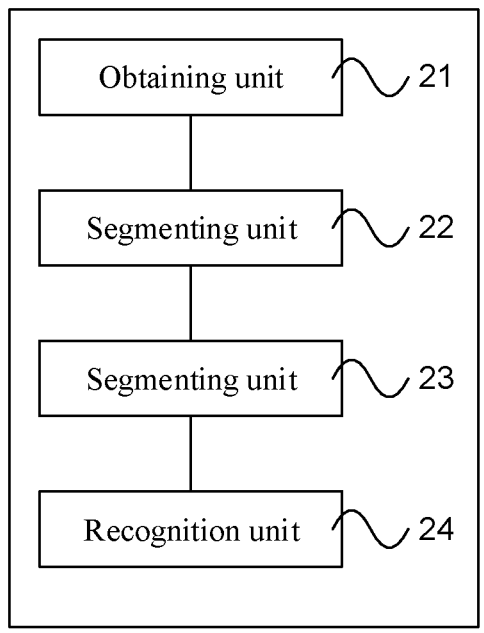
FIG. 2 is a structural schematic diagram of an image recognition apparatus according to another embodiment of the present disclosure.

FIG. 2 is a structural schematic diagram of an image recognition apparatus according to another embodiment of the present disclosure. As shown in FIG. 2, the image recognition apparatus of the present embodiment may include an obtaining unit 21, a segmenting unit 22, a matching unit 23 and a recognition unit 24, wherein the obtaining unit 21 is configured to obtain a to-be-recognized image of a designated space; the segmenting unit 22 is configured to perform image segmentation processing for the to-be-recognized image, to obtain at least one area image of the designated space; the matching unit 23 is configured to perform image matching processing for each area image in said at least one area image, to obtain a reference image corresponding to said each area image; the recognition unit 24 is configured to perform recognition processing for said each area image according to image information of the reference image corresponding to said each area image, to obtain article information of said each area image.

The so-called designated space may refer to an internal space of storage equipment, for example, an internal space of storage equipment such as a display cabinet, an open-type goods shelf, a refrigerator and a freezer.

It needs to be appreciated that the image recognition apparatus according to the present embodiment may be an application located at a local terminal, or a function unit such as a plug-in or Software Development Kit (SDK) arranged in the application located at the local terminal, or a processing engine located in a network-side server, or a distributed type system located on the network side. This is not particularly limited in the present embodiment.

It may be understood that the application may be a native application (nativeAPP) installed on the terminal, or a webpage program (webApp) of a browser on the terminal. This is not particularly limited in the present embodiment.

Optionally, in a possible implementation mode of the present embodiment, the segmenting unit 22 may specifically use an article detector to perform image segmentation processing for the to-be-recognized image, to obtain at least one area image of the designated space.

Optionally, in a possible implementation mode of the present embodiment, the matching unit 23 may specifically use each area image in said at least one area image to perform image matching processing in a pre-collected reference image of the designated article, to obtain the reference image corresponding to said each area image.

Optionally, in a possible implementation mode of the present embodiment, the recognition unit 24 may specifically perform recognition processing for said each area image according to image information of the reference image corresponding to said each area image and a recognition weight of the reference image, to obtain article information of said each area image.

Figure 3:
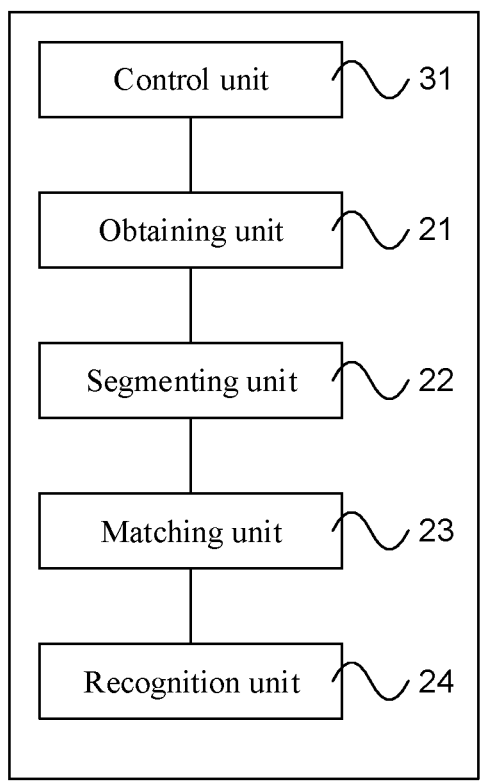
FIG. 3 is a structural schematic diagram of an image recognition apparatus according to another embodiment of the present disclosure.

Optionally, in a possible implementation mode of the present embodiment, the image recognition apparatus provided by the present embodiment as shown in FIG. 3 may further comprise a control unit 31 configured to obtain a movement state of the door body of the storage equipment where the designated space lies; and control ON and OFF of the camera device according to the movement state, to use the camera device to shoot the to-be-recognized image of the designated space.

Specifically, the control unit 31 is specifically configured to use a sensor device to obtain movement parameters of the door body; and obtain the movement state of the door body according to the movement parameters.

It needs to be appreciated that the method in the embodiment corresponding to FIG. 1 may be implemented by the image recognition apparatus provided in the present embodiment. For detailed description, please refer to relevant content in the embodiment corresponding to FIG. 1, and no detailed description will be presented any longer.

In the present embodiment, the obtaining unit obtains the to-be-recognized image of a designated space, the segmenting unit performs image segmentation processing for the to-be-recognized image, to obtain at least one area image of the designated space, and the matching unit performs image matching processing for each area image in said at least one area image, to obtain a reference image corresponding to said each area image, so that the recognition unit can perform recognition processing for said each area image according to image information of the reference image corresponding to said each area image, to obtain article information of said each area image. The so doing does not require manual participation and exhibits simple operations and a high rate of correctness, and thereby improves the recognition efficiency and reliability.

In addition, according to the technical solution according to the present disclosure, once the to-be-recognized image of the designated space is obtained, it is possible to automatically recognize the article information of the to-be-recognized image, effectively improve the recognition efficiency and effectively improve an recognition automation degree.

In addition, according to the technical solution according to the present disclosure, the change of the designated space is mainly caused by a manual operation, for example, an operator opens a door body of the storage equipment where the designated space lies, and takes an article away. Therefore, it is possible to control ON and OFF of a camera device according to a movement state of the door body of the storage equipment where the designated space lies, to use the camera device to shoot the to-be-recognized image of the designated space, thereby effectively reducing power consumption of the camera device.

Those skilled in the art can clearly understand that for purpose of convenience and brevity of depictions, reference may be made to corresponding procedures in the aforesaid method embodiments for specific operation procedures of the system, apparatus and units described above, which will not be detailed any more.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not cause essence of corresponding technical solutions to depart from the spirit and scope of technical solutions of embodiments of the present disclosure.

What is claimed is:

1. An image recognition method, wherein the method comprises:
    obtaining a to-be-recognized image of a designated space;
    performing image segmentation processing for the to-be-recognized image, to obtain at least one area image of the designated space;
    performing image matching processing for each area image in said at least one area image, to obtain a reference image corresponding to said each area image;
    performing recognition processing for said each area image according to image information of the reference image corresponding to said each area image, to obtain article information of said each area image,
    wherein the performing recognition processing for said each area image according to image information of the reference image corresponding to said each area image, to obtain article information of said each area image comprises:
        performing recognition processing for said each area image according to image information of the reference image corresponding to said each area image and a recognition weight of the reference image, to obtain article information of said each area image.

2. The method according to claim 1, wherein the designated space comprises an internal space of storage equipment.

3. The method according to claim 1, wherein the performing image segmentation processing for the to-be-recognized image, to obtain at least one area image of the designated space comprises:
    using an article detector to perform image segmentation processing for the to-be-recognized image, to obtain at least one area image of the designated space.

4. The method according to claim 1, wherein the performing image matching processing for each area image in said at least one area image, to obtain a reference image corresponding to said each area image comprises:
    using each area image in said at least one area image to perform image matching processing in a pre-collected reference image of the designated article, to obtain the reference image corresponding to said each area image.

5. The method according to claim 1, wherein before obtaining a to-be-recognized image of a designated space, the method further comprises:
    obtaining a movement state of a door body of the storage equipment where the designated space lies; and
    controlling ON and OFF of a camera device according to the movement state, to use the camera device to shoot the to-be-recognized image of the designated space.

6. The method according to claim 5, wherein the obtaining a movement state of a door body of the storage equipment where the designated space lies comprises:
    using a sensor device to obtain movement parameters of the door body; and
    obtaining the movement state of the door body according to the movement parameters.

7. A device, comprising one or more processor;
    a memory;
    one or more programs stored in the memory and configured to implement an image recognition method, wherein the method comprises:
    obtaining a to-be-recognized image of a designated space;
    performing image segmentation processing for the to-be-recognized image, to obtain at least one area image of the designated space;
    performing image matching processing for each area image in said at least one area image, to obtain a reference image corresponding to said each area image;
    performing recognition processing for said each area image according to image information of the reference image corresponding to said each area image, to obtain article information of said each area image,
    wherein the performing recognition processing for said each area image according to image information of the reference image corresponding to said each area image, to obtain article information of said each area image comprises:
        perforating recognition processing for said each area image according to image information of the reference image corresponding to said each area image and a recognition weight of the reference image, to obtain article information of said each area image.

8. The device according to claim 7, wherein the designated space comprises an internal space of storage equipment.

9. The device according to claim 7, wherein the performing image segmentation processing for the to-be-recognized image, to obtain at least one area image of the designated space comprises:

using an article detector to perform image segmentation processing for the to-be-recognized image, to obtain at least one area image of the designated space.

10. The device according to claim 7, wherein the performing image matching processing for each area image in said at least one area image, to obtain a reference image corresponding to said each area image comprises:
using each area image in said at least one area image to perform image matching processing in a pre-collected reference image of the designated article, to obtain the reference image corresponding to said each area image.

11. The device according to claim 7, wherein before obtaining a to-be-recognized image of a designated space, the method further comprises:
obtaining a movement state of a door body of the storage equipment where the designated space lies; and
controlling ON and OFF of a camera device according to the movement state, to use the camera device to shoot the to-be-recognized image of the designated space.

12. The device according to claim 11, wherein the obtaining a movement state of a door body of the storage equipment where the designated space lies comprises:
using a sensor device to obtain movement parameters of the door body; and
obtaining the movement state of the door body according to the movement parameters.

13. A non-transitory computer storage medium in which one or more programs are stored, an apparatus being enabled to implement an image recognition method, wherein the method comprises:
obtaining a to-be-recognized image of a designated space;
performing image segmentation processing for the to-be-recognized image, to obtain at least one area image of the designated space;
performing image matching processing for each area image in said at least one area image, to obtain a reference image corresponding to said each area image;
performing recognition processing for said each area image according to image information of the reference image corresponding to said each area image, to obtain article information of said each area image,
wherein the performing recognition processing for said each area image according to image information of the reference image corresponding to said each area image, to obtain article information of said each area image comprises:
performing recognition processing for said each area image according to image information of the reference image corresponding to said each area image and a recognition weight of the reference image, to obtain article information of said each area image.

14. The non-transitory computer storage medium according to claim 13, wherein the designated space comprises an internal space of storage equipment.

15. The non-transitory computer storage medium according to claim 13, wherein the performing image segmentation processing for the to-be-recognized image, to obtain at least one area image of the designated space comprises:
using an article detector to perform image segmentation processing for the to-be-recognized image, to obtain at least one area image of the designated space.

16. The non-transitory computer storage medium according to claim 13, wherein the performing image matching processing for each area image in said at least one area image, to obtain a reference image corresponding to said each area image comprises:
using each area image in said at least one area image to perform image matching processing in a pre-collected reference image of the designated article, to obtain the reference image corresponding to said each area image.

17. The non-transitory computer storage medium according to claim 13, wherein before obtaining a to-be-recognized image of a designated space, the method further comprises:
obtaining a movement state of a door body of the storage equipment where the designated space lies; and
controlling ON and OFF of a camera device according to the movement state, to use the camera device to shoot the to-be-recognized image of the designated space.

* * * * *

UNITED STATES PATENT AND TRADEMARK OFFICE
CERTIFICATE OF CORRECTION

PATENT NO. : 10,706,314 B2  
APPLICATION NO. : 16/081329  
DATED : July 7, 2020  
INVENTOR(S) : Chen Zhao et al.

Page 1 of 1

It is certified that error appears in the above-identified patent and that said Letters Patent is hereby corrected as shown below:

In the Claims

Column 12, Line 56, Claim 7:  
Before "recognition processing for said"  
Delete "perforating" and  
Insert -- performing --.

Signed and Sealed this  
Seventeenth Day of November, 2020

Andrei Iancu  
*Director of the United States Patent and Trademark Office*